(12) United States Patent
Bartels (10) Patent No.: US 7,354,182 B2
(45) Date of Patent: Apr. 8, 2008

(54) LIGHTING ASSEMBLY AND A WHEEL RIM INCLUDING A LIGHTING ASSEMBLY

(76) Inventor: Kurt Wilson Bartels, 121 Regency Blvd., Pueblo, CO (US) 81005

( * ) Notice: Subject to any disclaimer, the term of this patent is extended or adjusted under 35 U.S.C. 154(b) by 125 days.

(21) Appl. No.: 11/111,350

(22) Filed: Apr. 21, 2005

(65) Prior Publication Data

US 2006/0152938 A1    Jul. 13, 2006

Related U.S. Application Data

(60) Provisional application No. 60/580,336, filed on Jun. 16, 2004.

(51) Int. Cl.
*B60Q 1/26* (2006.01)

(52) U.S. Cl. .................. 362/500; 362/234; 362/375

(58) Field of Classification Search ............. 362/500, 362/42, 190–193, 800, 806, 184, 234, 249, 362/362, 364–366, 374, 375, 382; 310/73; 40/587; 359/524
See application file for complete search history.

(56) References Cited

U.S. PATENT DOCUMENTS

| | | |
|---|---|---|
| 1,539,394 A | 5/1925 | Leeman |
| 1,643,593 A | 9/1927 | Styer et al. |
| 2,083,514 A | 6/1937 | Brown |
| 2,526,548 A | 10/1950 | Franklin |
| 3,016,079 A | 1/1962 | Weller |
| 3,099,401 A | 7/1963 | Bell |
| 3,113,727 A | 12/1963 | Bradway |
| 3,140,111 A | 7/1964 | Dabroski |
| 3,389,937 A | 6/1968 | Brumfield |
| 4,088,882 A | 5/1978 | Lewis |
| 4,371,916 A | 2/1983 | De Martino |
| 4,381,537 A | 4/1983 | Hinrichs |
| 4,693,389 A | 9/1987 | Kalen |
| 4,787,014 A | 11/1988 | Wodder et al. |
| 4,796,972 A | 1/1989 | Thomas et al. |
| 4,800,469 A | 1/1989 | Leon |
| 4,881,153 A | 11/1989 | Scott |
| 5,276,593 A | 1/1994 | Lighthill et al. |
| 5,278,732 A | 1/1994 | Frankum |
| 5,455,485 A | 10/1995 | Kutter |
| 5,530,630 A | 6/1996 | Williams, Jr. |
| 5,552,972 A | 9/1996 | Rezvani |
| 5,800,035 A | 9/1998 | Aichele |

(Continued)

FOREIGN PATENT DOCUMENTS

GB    2338180    5/2003

(Continued)

OTHER PUBLICATIONS

Zinik Luxury Wheels, website printout, May 17, 2005.

*Primary Examiner*—Sandra O'Shea
*Assistant Examiner*—Bao Q. Truong
(74) *Attorney, Agent, or Firm*—Law Offices of John Chupa and Associates, P.C.

(57) ABSTRACT

A lighting assembly 10 which is adapted to be operatively placed within a portion or rim of a wheel, such as rims 802, 804, and which selectively generates light signals 800 or which is adapted to be integrally and operatively placed within a rim of a wheel, such as rims 802, 804.

17 Claims, 4 Drawing Sheets

U.S. PATENT DOCUMENTS

| | | | |
|---|---|---|---|
| 6,030,106 A * | 2/2000 | Johnson | 362/500 |
| 6,168,301 B1 | 1/2001 | Martinez et al. | |
| 6,322,237 B1 | 11/2001 | Lee | |
| 6,382,820 B1 | 5/2002 | Chung | |
| 6,601,979 B1 | 8/2003 | Byrd et al. | |
| 6,612,726 B1 | 9/2003 | Gloodt et al. | |
| 6,644,839 B2 | 11/2003 | Lee | |
| 7,052,170 B2 * | 5/2006 | Striebel | 362/640 |
| 2001/0050611 A1 | 12/2001 | Achterholt | |
| 2002/0089858 A1 | 7/2002 | Deutsch | |
| 2002/0131274 A1 | 9/2002 | Pittello | |
| 2002/0163792 A1 | 11/2002 | Formoso | |
| 2002/0172036 A1 * | 11/2002 | Chien | 362/500 |
| 2003/0031019 A1 | 2/2003 | Chen | |
| 2003/0169596 A1 | 9/2003 | Sharper | |
| 2003/0198059 A1 | 10/2003 | Castro | |
| 2003/0202356 A1 | 10/2003 | Hung | |
| 2004/0125612 A1 | 7/2004 | Jackson | |
| 2004/0130905 A1 | 7/2004 | Olds et al. | |
| 2004/0257825 A1 | 12/2004 | Choi et al. | |
| 2004/0264207 A1 | 12/2004 | Jones | |
| 2005/0030755 A1 | 2/2005 | Thomas et al. | |
| 2005/0030756 A1 | 2/2005 | Thomas et al. | |
| 2005/0052069 A1 | 3/2005 | Gilly et al. | |
| 2005/0099820 A1 | 5/2005 | Cooper | |

FOREIGN PATENT DOCUMENTS

| | | |
|---|---|---|
| JP | 63125402 | 5/1988 |
| JP | 401103502 A | 4/1989 |
| JP | 2004276887 | 10/2004 |
| JP | 2004276888 | 10/2004 |
| JP | 2004224188 | 12/2004 |

* cited by examiner

LIGHTING ASSEMBLY AND A WHEEL RIM INCLUDING A LIGHTING ASSEMBLY

This application claims the benefit of U.S. Provisional Application(s) No(s).: 60/580,336, filed on Jun. 16, 2004.

FIELD OF THE INVENTION

The present invention generally relates to a lighting assembly and to a wheel rim incorporating a lighting assembly and more particularly, to a lighting assembly which is adapted to be either selectively and operatively deployed within a wheel, or integrally and operatively placed within a portion of wheel or a wheel rim of a selectively movable assembly, such as and without limitation a vehicle, and which provides aesthetically pleasing illumination in a new and novel manner.

BACKGROUND OF THE INVENTION

It is desirable to selectively light or illuminate the wheels of a selectively movable apparatus or assembly, such as and without limitation, a motorized vehicle. This desirability emanates, in part, from a desire to selectively illuminate at least a portion of the environment immediately surrounding or disposed along the sides of the selectively movable assembly in order to promote safety (e.g., by allowing operators of other selectively movable assemblies in close proximity to the illuminated assembly to effectively and accurately view or see the illuminated assembly and to allow those individuals in close proximity to the illuminated assembly (e.g., a parked vehicle) to have an illuminated environment). This desirability also emanates, in part, from a desire to enhance the overall aesthetic visual appearance of the selectively movable assembly and to allow the owner of the assembly to personalize the assembly and to make a "statement" to those viewing the assembly.

While some attempts have been made to provide selective illumination of a selectively movable assembly, such as an automobile, these attempts do not provide a desired spatial distribution of, light (e.g., the headlights and taillights of an automobile do not effectively illuminate the side of the vehicle) and/or do not cost effectively provide the desired side or wheel illumination in a rather uncomplicated manner. In, fact, many of the prior side or wheel illumination assemblies are costly, complicated, and due to their inherent complexity are prone to failure and difficult and costly to install, maintain, repair, and replace.

The present invention overcomes these and other disadvantages of the prior illumination techniques and strategies.

SUMMARY OF THE INVENTION

It is a first non-limiting object of the present invention to provide a lighting or illuminating assembly which overcomes some or all of the various drawbacks of prior lighting and illuminating assemblies which are, by way of example and without limitation, delineated above.

It is a second non-limiting object of the present invention to provide a lighting assembly which overcomes some or all of the various drawbacks of prior lighting assemblies and which selectively illuminates the side portions of a selectively movable assembly, such as a vehicle.

It is a third non-limiting object of the present invention to provide a lighting assembly which overcomes some or all of the various drawbacks of prior lighting assemblies and which selectively illuminates the side portions of a selectively movable assembly in a cost effective, relatively uncomplicated, and aesthetically pleasing manner.

According to a first non-limiting aspect of the present invention, a lighting assembly is provided and includes a body portion which is selectively placed within a wheel rim bore; and a light generation assembly which is operatively contained within the body portion.

According to a second non-limiting aspect of the present invention, an assembly for use in combination with a wheel rim of the type having a center bore of a certain shape is provided. Particularly, the assembly includes a body having a shape which is substantially identical but slightly smaller than the certain shape; and a lighting assembly which is operatively housed within the body and which selectively generates light.

According to a third non-limiting aspect of the present invention, a wheel rim is provided and includes a center bore; and a lighting assembly which is operatively contained within the center bore.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
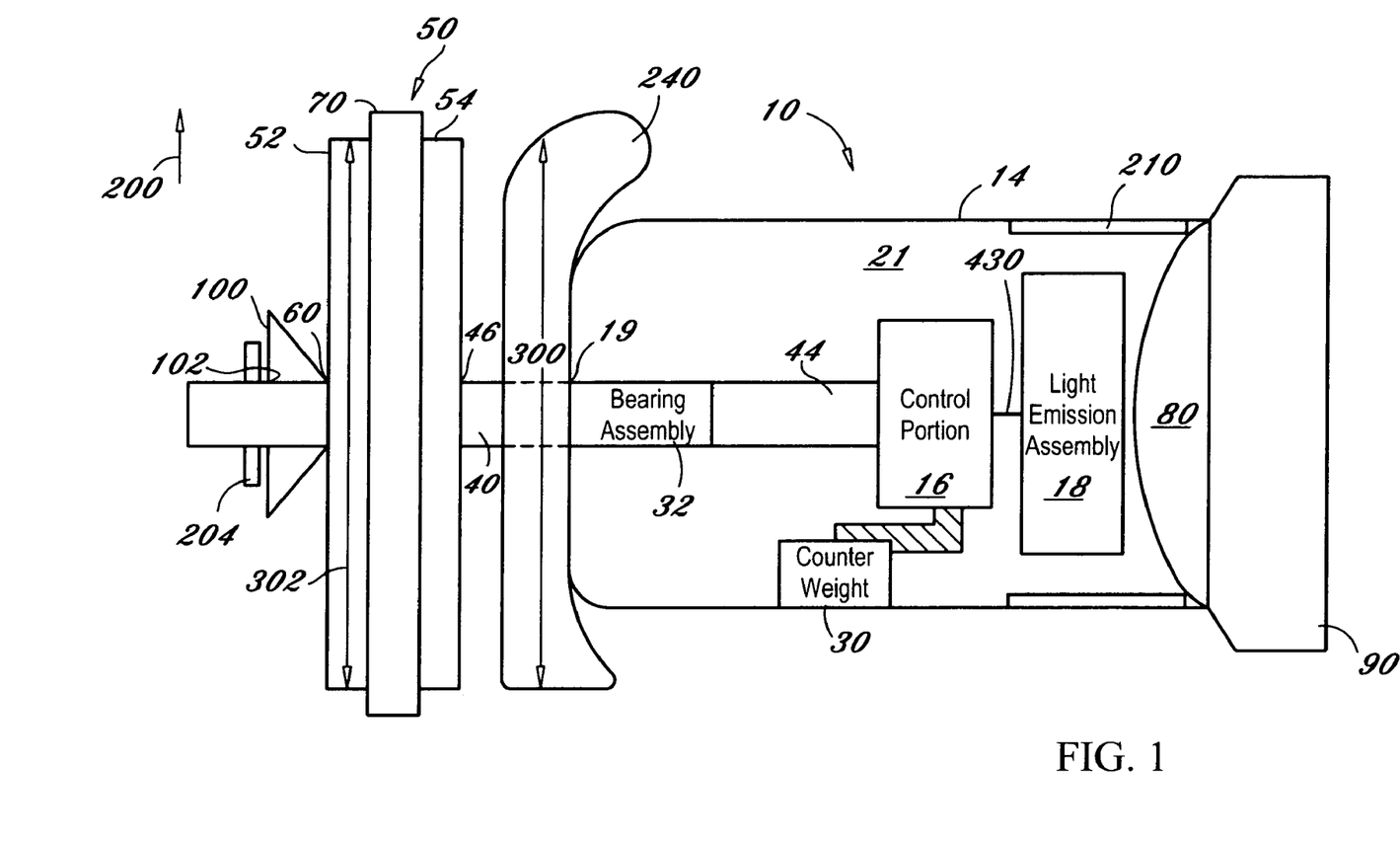
FIG. 1 is a side schematic view of a lighting, assembly which is made in accordance with the teachings of the preferred, although non-limiting, embodiment of the invention.
Figure 2:
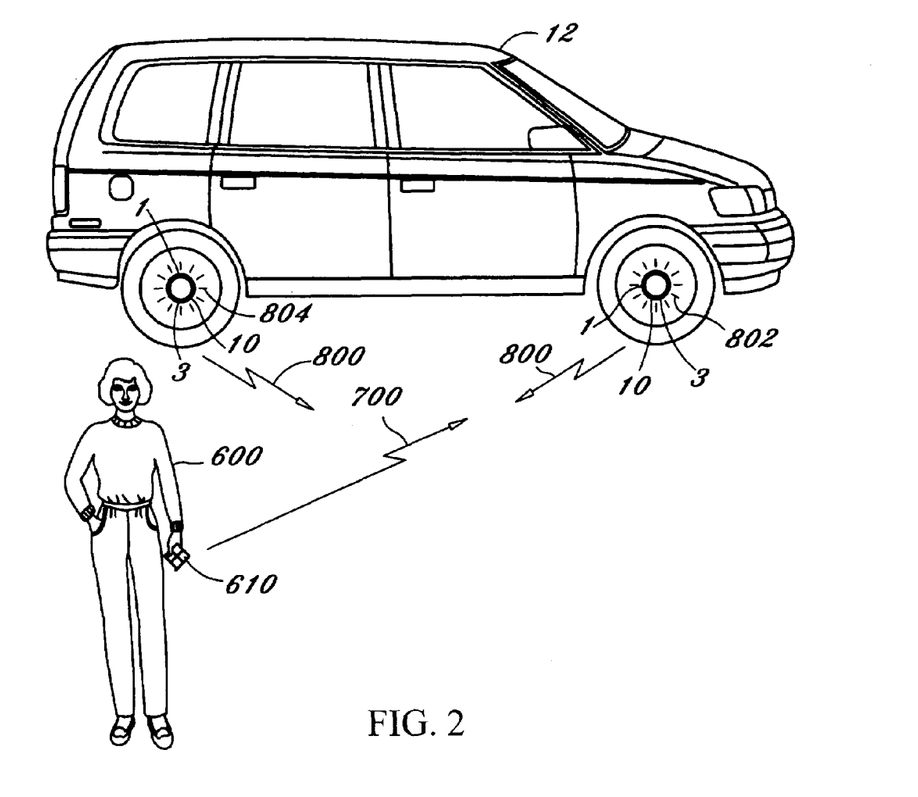
FIG. 2 is a perspective view of one non-limiting example of a selectively movable assembly which incorporates the lighting assembly which is shown in FIG. 1.

Referring now to FIGS. 1-7, there is shown a, lighting or selective illumination assembly 10 which is made in accordance with the teachings of the preferred embodiment of the invention and which overcomes some or all of the previously delineated drawbacks associated with prior lighting and illumination assemblies which are utilized on selectively movable apparatuses and assemblies, such as and without limitation a vehicle, such as vehicle 12 which is shown in FIG. 2. It should be realized that the various lighting assemblies of the various inventions may be used in combination with or as an integral part of substantially any desired selectively movable assembly or a portion of substantially any desired selectively movable assembly (including but not limited to manually movable assemblies), and that the various inventions, which are more fully described herein, are not limited to a particular type or class of selectively movable assembly, but may be used with any such desired assembly. It should be further realized that the terms "lighting" and "illumination" are interchangeably used in this description and mean or refer to the selective emanation of light or illuminating energy.

As shown best in FIG. 1, the lighting assembly 10 includes a housing 14 and a control portion 16. Particularly, the housing 14 is adapted to operatively house or contain the various light emitting and light emitting control portions of the assembly 10 (which are more fully described below) and, in one non-limiting embodiment of the invention, is generally cylindrical in shape (e.g., is generally shaped in the form of a conventional can), although other shapes may be utilized and it should be realized that the housing may have any desired shape.

Figure 5:
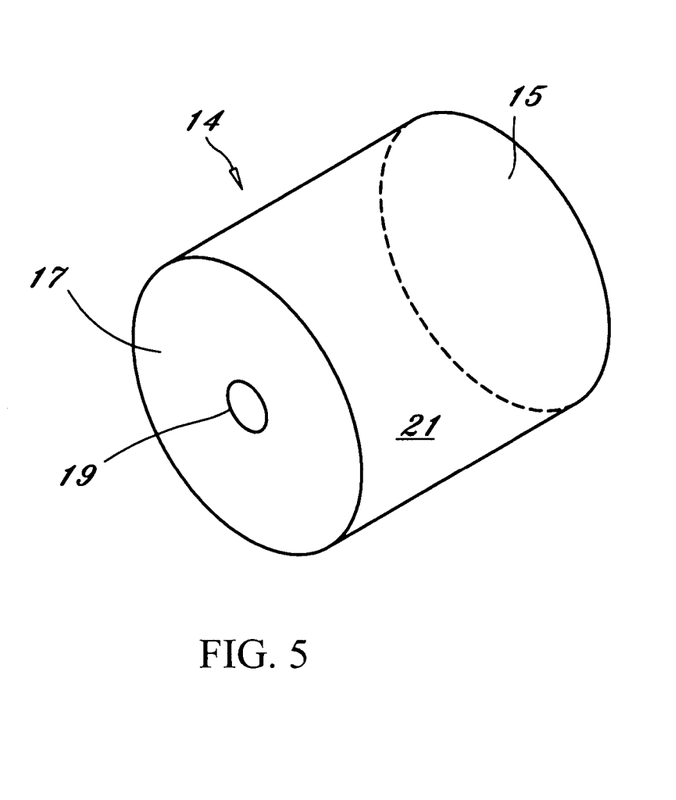
FIG. 5 is a perspective unassembled view of the housing portion of the lighting assembly which is schematically shown in FIG. 1.

In the "can like" configuration, which is shown in FIGS. 1 and 5, the housing 14 has a first substantially open end 15 and a second substantially closed end 17 which includes a relatively narrow aperture 19. The interior of the housing 14 is generally hollow and defines a cavity 21 which communicates with the aperture 19. Further, in one non-limiting embodiment of the invention, the housing 14 may be manufactured from plastic, metal, or substantially any other desired commercially available material and may even include a plurality of diverse or composite materials, in a manner and for a purpose which is more fully described below, and has a diameter which is typically smaller than the diameter of the wheel rim bore in which it is to be operatively disposed (e.g., the housing 14 has a shape which is substantially identical to but slightly smaller than the shape of wheel rim bore in which it is disposed). It should be appreciated that the term "bore" refers to substantially any desired opening or aperture within a wheel rim or a wheel or any portion of a wheel assembly.

The lighting assembly 10 further includes, in one non-limiting embodiment of the invention, a counterweight portion or member 30 which is coupled to at least a portion of the control portion 16 (e.g., the electric power generation portion), and, in one non-limiting embodiment, to the housing 14, and a bearing assembly 32 which isolates the housing 14 from the wheel bore or wheel portion in which it is disposed. Further, the lighting assembly 10 includes an elongated threaded member 40 which traverses and operatively protrudes on either side of the aperture 19, and is received by and traverses the bearing 32. Particularly, a first end 44 of the threaded member 40 is coupled to the control portion 16 (e.g., to the shaft of a generator which is included in the control portion 16), by use of a coupling member or some other member, while passing through the bearing assembly 32, and a second and opposed end 46 of the threaded 40 member protrudes from the aperture 19 in a direction away from the control portion 16. It should be appreciated that the end of the member 40 which passes through the bearing assembly 32 and is coupled to the control portion 16 need not necessarily be threaded, in other non-limiting embodiments of the invention and may even "drive" the generator or electrical power producing portion of the control portion 16.

Figure 3:
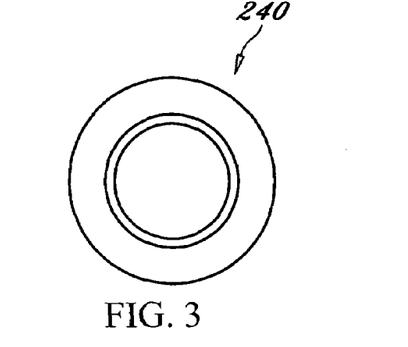
FIG. 3 is a front view of the adapter portion of the lighting assembly which is schematically shown in FIG. 1.

The lighting assembly 10 further includes a wheel rim or bore or "central bore" adapter portion or assembly 50 including a first generally flat and spherical plate member 52 and a second and generally flat and spherical plate member 54 which, in one non-limiting embodiment of the invention, is substantially identical to the first member 52. Particularly, each of the members 52, 54 have respective apertures 60 which are substantially and axially aligned and which respectively receive the threaded member 40. In the most preferred embodiment of the invention, the members 52, 54 are initially placed upon the threaded member 40 in a mutually and linearly coextensive relationship or manner. Further, the assembly 50 includes an abutment or frictional engagement member 70 (e.g., an O-ring) which is operatively and frictionally positioned between the two members 52, 54, which receives the threaded portion 40 (e.g., the threaded portion 40 traverses the member 70), and which is initially in a linearly coextensive relationship with the members 52, 54, although the abutment member 70 may have a larger diameter than either of the members 52, 54.

As is further illustrated in the attached FIGS. 1-7, the lighting assembly 10 includes a substantially convex reflector portion or member 80 which is operatively and frictionally fitted within the substantially open end 15 of the housing 14, which substantially and operatively resides within the cavity 21, and which is in a communication relationship with a light emission assembly 18 which is operatively included within the assembly 10. In one non-limiting embodiment of the invention, the lighting assembly 10 further includes a chrome or decorative ring member 90 which is attached to the circumferential periphery of the substantially open end 15 of the housing 14, thereby surrounding but exposing the portion 80, and allowing the lighting assembly 10 to be even more aesthetically pleasing (e.g., the decorative ring member 90 is exposed and viewed by those in close proximity to the assembly upon which the lighting assembly 10 is disposed, such as vehicle 12).

The lighting assembly 10 further includes a cam member 100 which is movably disposed upon the threaded member 40 since the member 100 includes a threaded aperture 102 having threads which are complementary to the threads included upon the threaded member 40 and which includes, in the most preferred, although non-limiting embodiment of the invention, a substantially triangular cross sectional area. It should be appreciated that the term "complementary" means that the threads which are disposed within the aperture 102 cooperate with the threads which are resident upon the threaded member 40 to allow the cam member 100 to selectively and axially move upon the threaded member 40 from a first position which is remote from the member 52 to a second position in which the member 100 engages the member 52.

That is, when the member 100 is selectively moved into forced engagement with the member 52, the member 52 is forced upwards in the direction of arrow 200, (e.g., member 52 moves with respect to member 54), thereby allowing the assembly 50 to selectively expand and therefore to be frictionally resident within wheel rim bores of varying diameters, such as wheel bores 3 which are shown in FIG. 2. To aid such selective engagement, in some non-limiting embodiments, the lighting assembly 10 further includes a nut or other member 204 which is movably disposed upon the threaded member 40 in the same manner in which the cam member 100 is movably disposed upon the threaded member 40. In this manner, the nut 204 is used to selectively compress the cam member 100 against the member 52 and to allow the member 52 to be remote from or be in a disengaging relationship with the member 52.

Figure 4:
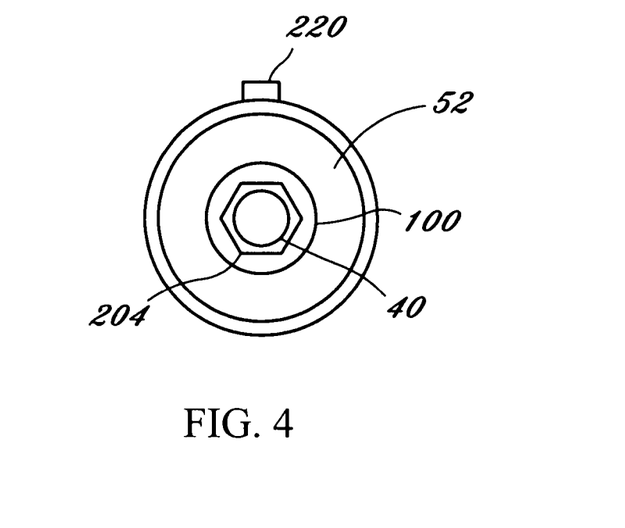
FIG. 4 is a front view of the center bore mounting portion of the lighting assembly which is schematically shown in FIG. 1.

In some non-limiting and alternate, embodiments of the invention, the housing 14 includes a clear or substantially transparent lens portion 210 which substantially surrounds the light emission assembly 18 and, in yet further non-limiting embodiments of the invention, the member 52 includes projections or bullet portions, such as portion 220 of FIG. 4, which allows the displaced member 52 to be fitted within bores of even greater diameters (e.g., the portions, such as portion 220, selectively engage the interior surface of a wheel rim bore, such as interior surface 1 of one of the bores 3). It should be appreciated that in even other alternate embodiments of the invention, a second cam member, which is substantially similar to cam member 100, may be movably disposed upon the threaded member 40 and adapted to selectively engage the member 54, thereby forcing the member 54 in the direction of arrow 200. Such movement of this second provided cam member is independent of the movement of the cam member 100 and the movement of the member 54 in the foregoing manner in combination with the aforedescribed movement of cam member 52 increases the likelihood that the lighting assembly 10 will remain fitted within a large diameter wheel rim bores, such as one of the bores 3 of rims 802, 804. That is, both the members 52, 54 will selectively engage the internal surface of the large diameter wheel bore, such as bore 3, thereby increasing the "placement stability" of the lighting assembly 10 within these types of large diameter bores. The second cam member may also have projection or bullet portions, such as portion 220.

In yet a further non-limiting embodiment of the invention, a retainer adapter member 240 is disposed upon the threaded member 40 and in an engagement relationship with the case or housing portion 14 while allowing member 40 to pass there through. This member 240 may be formed from plastic, rubber, or substantially any other desired material and is adapted to have a length or diameter 300 which is substantially longer than the length or diameter 302 of the member 52, thereby allowing the lighting assembly 10 to be placed within relatively large diameter wheel rim bores (e.g., the member 240 frictionally fits and is secured within the respective interior surfaces of these relatively large wheel rim bores, such as interior surfaces 1 of bores 802 and 804). It should be appreciated that, in this manner, the lighting assembly 10 may be selectively and operatively placed within substantially any wheel bore having substantially any diameter and that such placement may be effectuated by the utilization of a member 240 having a diameter or length 300 which is substantially similar to (e.g., is slightly larger than) the diameter or length of the bore to which it is to be placed (e.g., by increasing the diameter or length of the member 240, one may place the assembly 10 in even larger diameter wheel rim bores than that which may contain the assembly 10 without the member 240). In one non-limiting embodiment, the member 240 may obviate the need for assembly 50.

Figure 6:
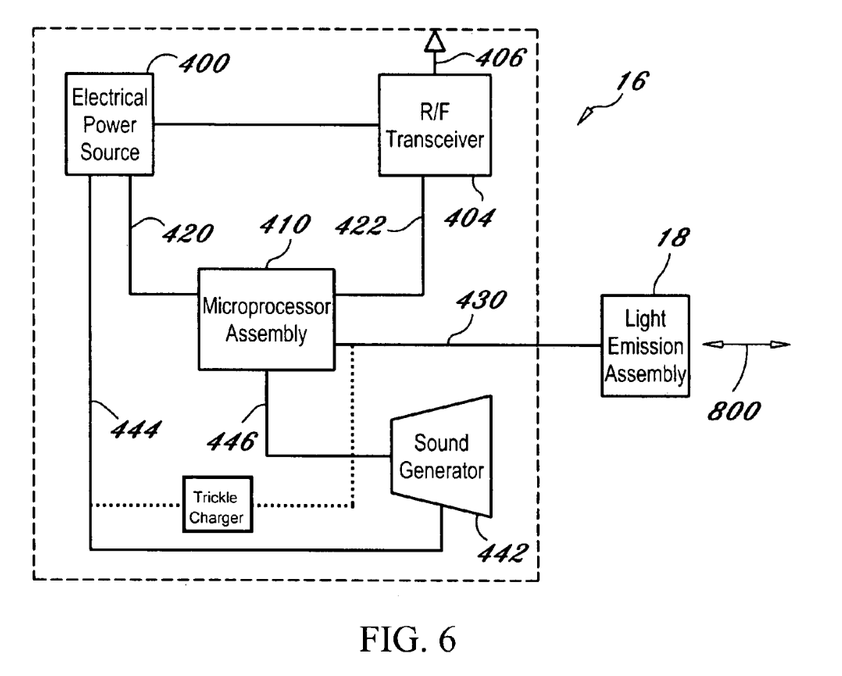
FIG. 6 is an electrical schematic diagram of the control portion of the lighting assembly which is schematically shown in FIG. 1.

Referring now to FIG. 6, there is shown an electrical schematic diagram of the control assembly or portion 16. Particularly, the control assembly or portion 16 includes an electrical power source 400 which may comprise a battery (e.g., a lithium-ion type battery), a generator, and/or the conventional and normally supplied battery of the vehicle 12 or other selectively movable assembly that the lighting assembly 10 is operatively disposed within and/or upon (e.g., in self-powered or "non-manual" applications). Further, the control assembly or portion 16 includes, in one non-limiting embodiment of the invention, a radio frequency, ultrasonic, infrared or other type of transceiver 404, including an antenna 406, and a microprocessor or other type of controller assembly 410 which is operable under stored program control and which includes the software, firmware, or a combination of software and firmware and/or other logic which is necessary to define the function and operation of the control portion 16 and of the entire lighting assembly 10.

The microprocessor or controller assembly 410 is physically and operatively coupled to the electrical power source 400 by the bus 420 and to the transceiver portion 404 by the bus 422 and may include both a central processor, such as by way of example and without limitation a Pentium® type processor and memory for storing the central control logic. The microprocessor or controller assembly 410 is further physically and operatively coupled to the light emission assembly 18 by the bus 430. Further, in one non-limiting embodiment of the invention, the control portion 16 includes a sound generator 442 which is physically and operatively coupled to the microprocessor or controller assembly 410 by the bus 446 and to the electrical power source by the bus 444.

Figure 7:
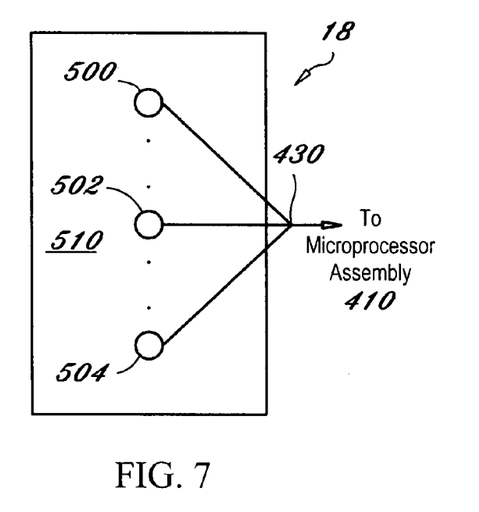
FIG. 7 is a schematic diagram of the light, emission assembly which is schematically shown in FIG. 1.

Referring now to FIG. 7, there is shown one non-limiting example of a light emission assembly 18. Particularly, the light emission assembly 18 includes several selectively and electrically energizable lighting elements 500, 502, 504 which, in one non-limiting embodiment of the invention, each comprise light emitting diodes of substantially any desired color, size, shape, and intensity. A desired number of such elements may be utilized within the light emission assembly 18. Further, 15 each of the provided elements, such as elements 500, 502, and 504, are mounted upon a convex reflector member 510 which is in close proximity to and in communication relationship with the convex mirror 80 and the lens 210, and which is fixedly positional within the cavity 21 of the housing 14 (e.g., by the use of glue or some other conventional type of fastener elements of assembly).

In operation, a user, such as user 600 utilizes a key fob or transmitter 610 which is adapted to selectively generate signals, such as signal 700, which are received by the antenna 406, communicated from the antenna 406 to the transceiver 404, demodulated by the transceiver 404, and then communicated to the microprocessor or controller assembly 410 where, they respectively cause the microprocessor or controller 410 to perform some action depending upon the nature or type of the signal and the stored program (e.g., the then current central state that the contained control "logic" resides within). The transmitter 610 may be of "the battery powered type" and be substantially similar to a commercially available remote keyless entry or automobile alarm transmitter and may even be voice activated.

By way of example and without limitation, a first signal, such as signal 700, may be effective to cause the microprocessor or controller assembly 420 to source electricity from the power source 400 to the light emission assembly 18, thereby selectively and electrically energizing each of the members or elements, such as 500, 502, 504, and causing light signals 800 to be generated from at least one of the wheel rims 802, 804 of vehicle 12. A second such signal may cause microprocessor or controller assembly 410 to source electrical energy from the source 400 to the sound generator 442, thereby allowing sound to selectively emanate from the vehicle 12 or other selectively movable assembly. In one non-limiting embodiment of the invention, the sound may be "preprogrammed" or stored within the microprocessor or controller assembly 410 and/or selectively programmed or placed into the assembly 410 by a user of the assembly 10. A third such signal may be effective to cause the microprocessor or controller assembly 410 to interrupt the transmission of electrical energy to the light emission assembly 18 and/or to the sound generator 442, thereby selectively "deactivating" the lighting assembly 10.

Particularly, upon receipt of electrical energy, the light emission assembly 18 is selectively energized and generates light energy which is communicated to the portions 510 and 80 from the energized members, such as members 500, 502, 504, and then reflected from portions 510 and 80 before emanating through the ring 90 into the environment in which the selectively movable assembly, such as vehicle 12 is operatively deployed. It should be appreciated that the counterweight 30, in the previously described non-limiting embodiment, substantially prevents housing 14 from rotating or turning with the wheel rims, such as wheel rims 802, 804. However, the shaft 40 does turn the electric power generation portion (e.g., a generator), thereby allowing the generator to generate electricity.

Figure 8:
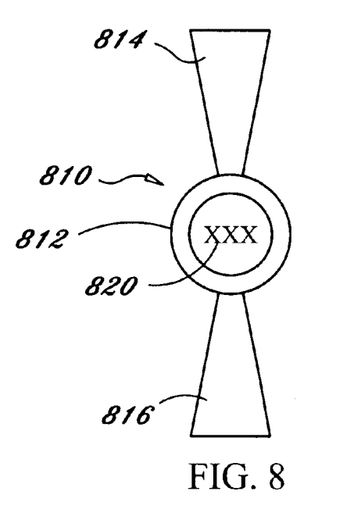
FIG. 8 is a front view of a lighting assembly which is made in accordance with the teachings of yet another alternate embodiment of the invention.

Referring now to FIG. 8, there is shown another alternate embodiment of the invention in which the ring 90 is replaced by the assembly 810. Particularly, the assembly 810 includes a substantially transparent central portion 812 which is adapted to be selectively and movably placed upon the end 15 of the housing 14 (e.g., the central portion 812 is loosely and frictionally placed upon the end 15) which substantially overlaying the mirror 80, and including, substantially identical propeller projections 814, 816 which move or rotate in response to the movement of the wheel rim that they are disposed upon. Further, in yet another non-limiting embodiment of the invention, a monogram or written portion 820, may be placed upon the central portion 812 to increase the overall aesthetic appearance of the lighting assembly 10. It should be appreciated that the member of propeller portions 814, 816 may vary and that the size and shape of these portions, such as portions 814, 816 may vary as desired.

In another non-limiting embodiment of the invention, the counterweight portion 30, the control portion 16, and the light emission portion 18, and the portion 80 are removed from the housing 14 and the portion 810 is directly attached to the bearing 32, thereby selectively rotating with the movement of the rim, such as rims 802, 803.

In other non-limiting embodiments, illuminated tape, paint, and/or other decorative substances and/or elements may be selectively placed upon the portion 810 and/or to the portions, such as portions 814, 816. In other non-limiting embodiments, the control portion 16 may include a trickle charger which is operatively coupled to the battery/power source 400 and the assembly 18 and is effective to selectively maintain the energization of the assembly 18. It should be further realized that lighting assembly 10 may be integrally formed within the wheels, rims, such as wheel rims 802, 804 and that assembly 10 is relatively easy to install, maintain, and replace, is of a substantially uncomplicated design and is very cost effective. In yet another non-limiting embodiment of the invention, the counterweight 30 may alternatively be coupled to the housing 14 or an additional counterweight may be coupled to the housing 14. Also, in another non-limiting embodiment, the bearing assembly 32 is removed and member 40 terminates in an "uncoupled manner" within cavity 10. In this non-limiting embodiment, the counterweight 30 is only coupled to the generator shaft or electrical power source 400 (and not to member 40), thereby allowing the housing 14 to selectively rotate while maintaining the light emitting portion 18 in a stationary position.

It should be appreciated that the various inventions are not limited to the exact embodiments which have been disclosed above, but that various modifications may be made without departing from the scope of the inventions as are set forth in the following claims. It should further be appreciated that unique assemblies 10 may be respectively placed in unique wheel bores of a movable assembly (e.g., each such bore includes a unique assembly 10).

What is claimed is:

1. A lighting assembly comprising a body portion which is selectively placed within a wheel rim bore; a light generation assembly which is operatively contained within said body portion, wherein said body portion is selectively expandable and includes a generally cylindrical housing which operatively contains said light generation assembly; and comprises a center bore adapter which is coupled to said housing and which includes a first generally circular and flat member; a second generally circular and flat member; and an abutment member which is contained between said first and second generally circular flat members.

2. The lighting assembly of claim 1 wherein said first and second generally circular members are substantially identical.

3. The lighting assembly of claim 2 wherein said abutment member comprises an O-ring.

4. The lighting assembly of claim 1 wherein said light generation assembly comprises a battery; and a light emission assembly which is coupled to said battery and which selectively receives electrical power which emanates from said battery.

5. The lighting assembly of claim 4 wherein said light generation assembly comprises a generator; and a light emission assembly which is coupled to said generator.

6. The lighting assembly of claim 4 wherein said light generation assembly further comprises a radio frequency receiver which is coupled to said battery and which selectively prevents said electrical energy from being coupled to said light emission assembly.

7. The lighting assembly of claim 6 wherein said light emission assembly comprises a plurality of light emitting diodes.

8. The lighting assembly of claim 5 wherein said generator is coupled to a counterweight portion.

9. The lighting assembly of claim 4 further comprising a trickle charge assembly which is coupled to said battery and to said light emission assembly.

10. An assembly for use in combination with a wheel rim of the type having a center bore of a certain shape, said assembly comprising a body having a shape which is substantially identical but slightly smaller than said certain shape; and a lighting assembly which is operatively housed within said body and which selectively generates light; wherein said body comprises a first generally flat and circular member having at least a first bullet portion; a second generally flat and circular member having at least a second bullet portion ; an abutment member which is operatively disposed between said first and second generally circular members; and a cam member which is movable from a first position in which said cam member is remote from said first generally flat and circular member to a second position in which said cam member contacts said first generally flat and circular member, thereby causing said first generally flat and circular members to move with respect to said second generally flat and circular member and causing said first bullet portion to selectively contact an interior surface of said bore, thereby allowing said body to be fitted within said center bore.

11. The assembly of claim 10 wherein said abutment member comprises an O-ring.

12. The assembly of claim 10 wherein said lighting assembly comprises a battery which selectively emits electrical power; and a plurality of light emission assemblies which are coupled to said battery and which, upon receipt of said electrical power, emit light energy.

13. The assembly of claim 12 wherein said lighting assembly further comprises a radio frequency receiver which is coupled to said battery and which selectively inhibits the reception of said electrical power by said plurality of light emission assemblies.

14. The assembly of claim 10 wherein said lighting assembly comprises a generator which provides electricity; and a plurality of light emission assemblies which are coupled to said generator and which receive said electricity from said generator and which, in response to the received electricity, emit light energy.

15. The assembly of claim 14 wherein said plurality of light emission assemblies comprises a plurality of light emitting diodes.

16. The assembly of claim 10 further comprising a remote transmitter which is communicatively coupled to said radio frequency receiver.

17. The assembly of claim 10 further comprising a lens which is removably coupled to said body and which substantially overlays said lighting assembly.

* * * * *